UNITED STATES PATENT OFFICE.

WILLIAM H. BUTLER, OF CHICAGO, ILLINOIS, ASSIGNOR OF ONE-HALF OF HIS RIGHT TO FREDERICK HAWKINS, OF SAME PLACE.

IMPROVEMENT IN THE PROCESSES OF CLEANING AND RENOVATING COFFEE.

Specification forming part of Letters Patent No. 127,955, dated June 18, 1872.

Specification describing an Improved Process of Cleaning and Renovating Coffee, invented by WILLIAM H. BUTLER, of Chicago, in the county of Cook and State of Illinois.

The object of this invention is to clean coffee by removing all external earth, dust, and material that adheres to the outside of the berry. It answers the purpose of cleaning by water, but has the advantage of not swelling the berry. My patent of January 2, 1872, describes a process of scouring the coffee by agitation in contact with sand or other gritty material to remove fungus and mold and other like close adhering impurities. The present process is not for that purpose, but is to cleanse pure coffee by removing the dirt mixed with and and adhering to the coffee upon the surface.

I place the coffee to be cleaned, together with an equal quantity, more or less, of clean common sawdust, in a vessel of any proper construction, and agitate the mixture until the coffee is perfectly cleaned by contact with the sawdust, to which the dirt adheres in preference to adhering to the coffee. The coffee is thus perfectly cleaned without wetting it, which would tend to swell the berry and otherwise injure it by causing mold and by extracting in a measure the strength from the berry.

Claim.

Having thus fully described my invention, what I claim as new, and desire to secure by Letters Patent, is—

The process of cleansing coffee, substantially as above described, by agitating the coffee in contact with sawdust placed in a vessel.

W. H. BUTLER.

Witnesses:
    HEINRICH F. BRUNS,
    JOHN W. MUNDAY.